United States Patent [19]

Cowdery et al.

[11] Patent Number: 5,050,477
[45] Date of Patent: Sep. 24, 1991

[54] HELICOPTER INCLUDING MISSILE TRANSPORTING AND LAUNCHING APPARATUS

[75] Inventors: Roy L. Cowdery; James W. Schofield, both of Sherborne, England

[73] Assignee: Westland plc, Yeovil, England

[21] Appl. No.: 742,079

[22] Filed: Mar. 19, 1985

[30] Foreign Application Priority Data

Mar. 19, 1984 [GB] United Kingdom ............... 8407135

[51] Int. Cl.$^5$ ........................... F41F 3/04; F41A 9/00
[52] U.S. Cl. .................. 89/1.802; 89/1.804; 89/1.805; 89/1.815; 89/37.17
[58] Field of Search ............. 89/1.8, 1.801, 1.802, 89/1.805, 1.815, 1.804, 37.17, 37.16

[56] References Cited

U.S. PATENT DOCUMENTS

| | | | |
|---|---|---|---|
| 2,792,757 | 5/1957 | Carlberg et al. | 89/1.802 |
| 2,987,963 | 6/1961 | Eaton | 89/1.805 |
| 3,173,334 | 3/1965 | Landstrom | 89/1.802 |
| 3,468,215 | 9/1969 | Alpert | 89/1.8 |
| 3,766,828 | 10/1973 | Cords | 89/1.8 |
| 4,444,087 | 4/1984 | Hunter et al. | 89/1.802 |

Primary Examiner—John S. Maples
Attorney, Agent, or Firm—Larson and Taylor

[57] ABSTRACT

A helicopter includes missile storage means (29) adapted to store a plurality of missiles (26) laterally within a fuselage (28) and missile launcher means (40) located at the end of a lateral outrigger (27) for pivotal movement about a generally vertical axis (42) between a loading position generally laterally of the fuselage and a launch position generally parallel with a longitudinal centreline of the fuselage. In the illustrated embodiment, the launcher means comprises an elongated support beam (45) for selective engagement by a longitudinally extending tubular member (32) attached to each missile and includes transfer means (51, 52, 60, 61) for transferring a missile between the storage means and the launcher means when the latter is in said loading position.

7 Claims, 5 Drawing Sheets

HELICOPTER INCLUDING MISSILE TRANSPORTING AND LAUNCHING APPARATUS

This invention relates to a helicopter including missile transporting and launching apparatus.

In the context of this invention the term "missile" refers to a device that is normally stored, transported and launched from a tubular cannister, and all references to a missile herein are to be construed accordingly.

It is known to provide a helicopter with missile transporting and launching apparatus. Normally, such apparatus comprises outriggers extending laterally from both sides of the fuselage and each adapted to carry a plurality of missiles. Such outboard mountings have a large drag penalty and are complex and heavy because each missile must have its own mounting and an umbilical connection to connect with a pilot-operated firing means. Normally, the missile mounting is moveable in elevation; however, since all the missiles have to be moved in unison this requires two heavy elevation motors and operating mechanisms, one on each side of the helicopter. Furthermore since the missiles are in the open, considerable problems can occur as a result of vibration, icing etc.

Accordingly, this invention provides a helicopter including missile storage means adapted to store a plurality of missiles laterally within the fuselage, missile launcher means located at the end of a laterally extending outrigger for pivotal movement about a generally vertical axis between a loading position generally laterally of the fuselage and a launch position generally parallel with a longitudinal centreline of the fuselage and transfer means for transferring a missile between the storage means and the launcher means when the latter is in said loading position.

The launcher means may include an elongated support beam adapted for selective engagement by a longitudinally extending tubular member attached to each missile, and the transfer means may comprise power operated means adapted to selectively withdraw a missile from said storage means so that said tubular member engages the elongated support beam to support the missile on said launcher means.

The transfer means may include a loading rod slidable parallel to and beneath the support beam and having automatic means for effecting attachment to the missile. Conveniently, said automatic means comprises a lateral recess in an upper surface of the loading rod for engagement by a downwardly protruding web on the missile tubular member.

A power operated cable drum may include a first cable extending forwardly for attachment adjacent the front end of the loading rod and a second cable extending rearwardly for attachment adjacent a rear end of the loading rod whereby rotation of the cable drum causes sliding movement of the loading rod for transferring a missile.

The missile storage means may comprise a carousel mounted for rotation about a generally horizontal laterally extending axis and includes a plurality of circumferential missile storage positions.

The invention will now be described by way of example only and with reference to the accompanying drawings in which.

Figure 1:
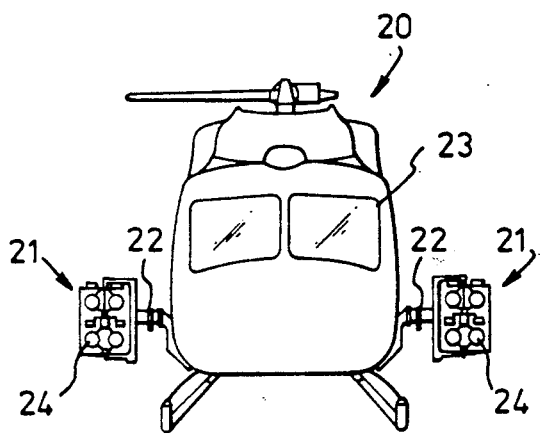
FIG. 1 is a front view of a helicopter including a known type of missile transporting and launching apparatus.
Figure 2:
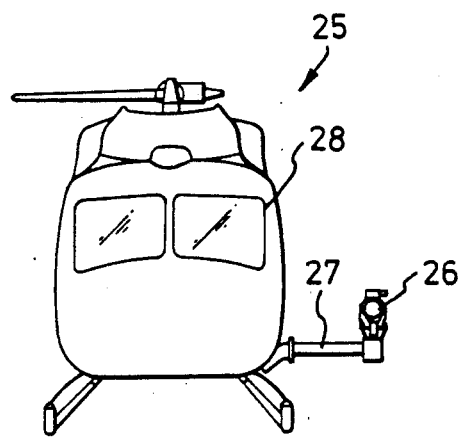
FIG. 2 is a front view of a helicopter including a missile transporting and launching apparatus constructed in accordance with the invention.

Referring now to FIG. 1, a helicopter 20 is fitted with a known missile transporting and launching apparatus 21 located on laterally extending outriggers 22 extending from both sides of the helicopter fuselage 23. Each apparatus 21 is capable of transporting and launching four missiles 24 and is adjustable in elevation by a motor (not shown) and fixed in azimuth. FIG. 2 is a view similar to FIG. 1 but illustrating a front view of a helicopter 25 fitted with a missile transporting and launching apparatus of the invention. As will be seen, a single missile 26 is supported at the end of an outrigger 27 extending laterally from one side of the fuselage 28.

Figure 3:
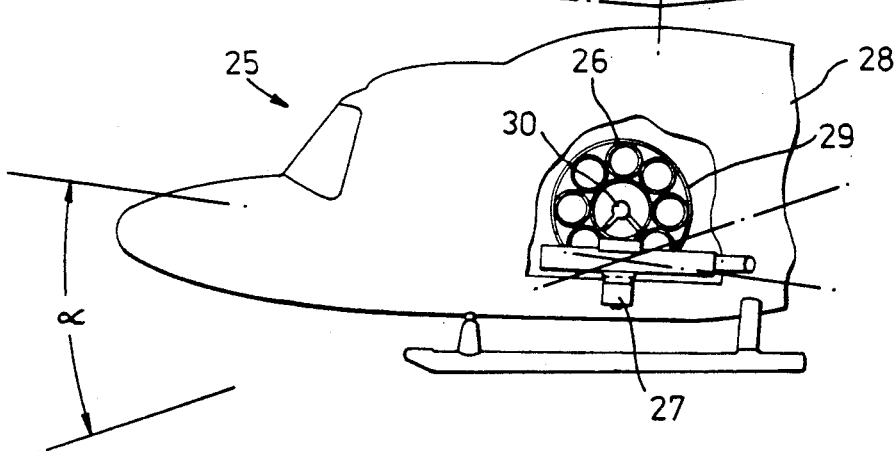
FIG. 3 is a fragmentary side elevation of the helicopter of FIG. 2.
Figure 4:
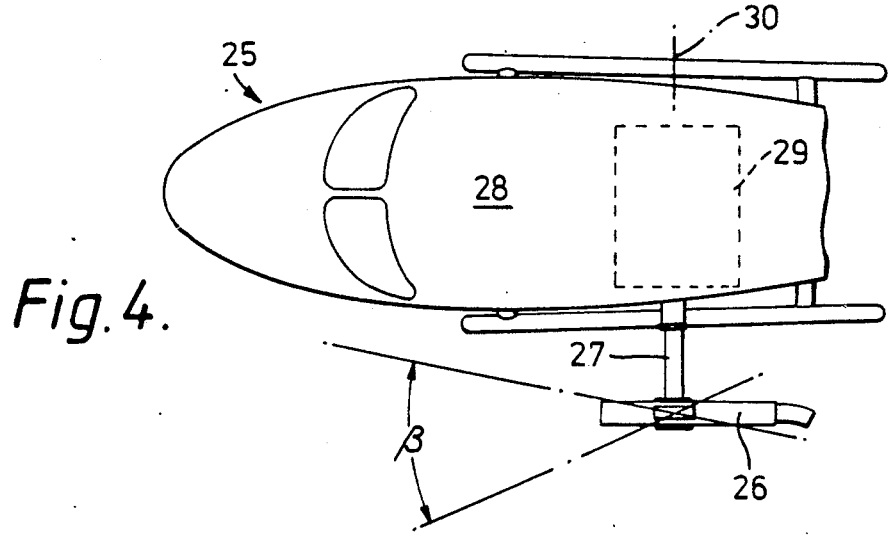
FIG. 4 is a fragmentary plan view of the helicopter of FIGS. 2 and 3.

As will be evident from a viewing of FIGS. 3 and 4, the apparatus of this invention includes a missile storage means located within the helicopter fuselage 28. In the illustrated embodiment the storage means comprises a carousel 29 supported within the fuselage 28 for rotation about a horizontal laterally extending axis 30. The carousel 29 is capable of carrying eight missiles 26 in circumferentially located storage positions.

Figure 5:
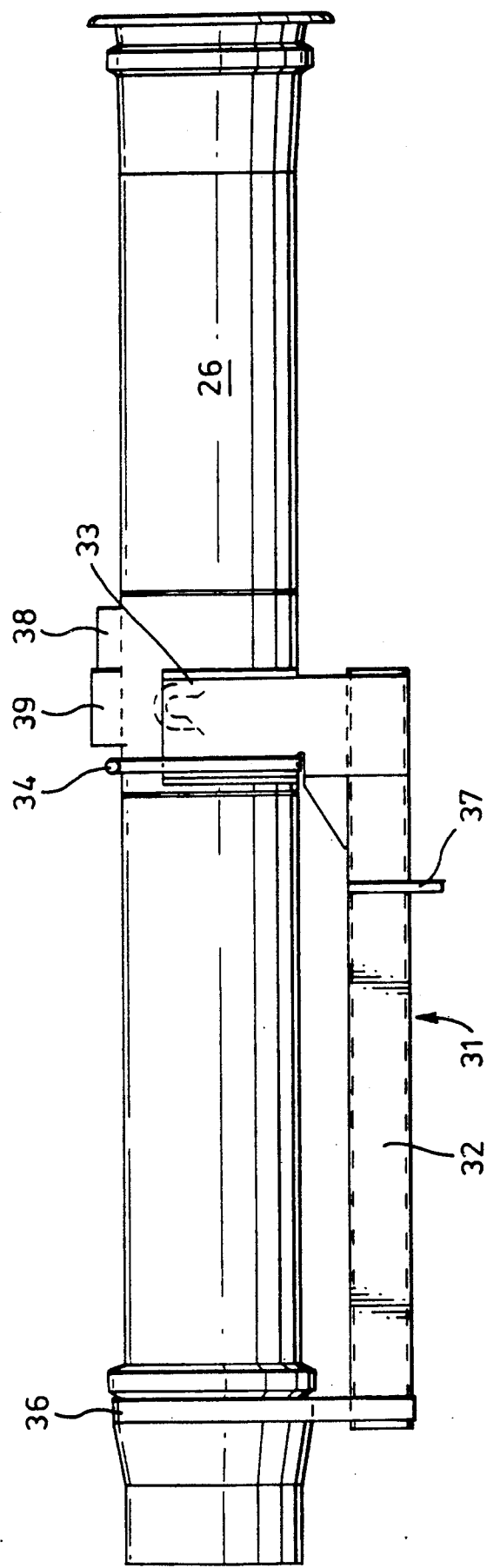
FIG. 5 is a fragmentary side elevation of a missile and part of the apparatus of this invention.

Each of the missiles 26, or to be more precise, the missile cannisters, is fitted with an adaptor generally indicated at 31 in FIG. 5. The adapter 31 consists of a longitudinally extending square tubular member 32 extending through about half the overall length of the missile and at the forward end thereof. The member 32 is supported at one end by a cradle 33 secured by a strap 34 in the central region of the missile and at the forward end of the missile by a strap 36. A downwardly protruding laterally extending web 37 is located towards the rear end of the member 32 for a purpose to be hereinafter described.

An electrical receptacle 38 and hold-back pin receptacle 39 are provided in known manner on the missile 26.

Figure 6:
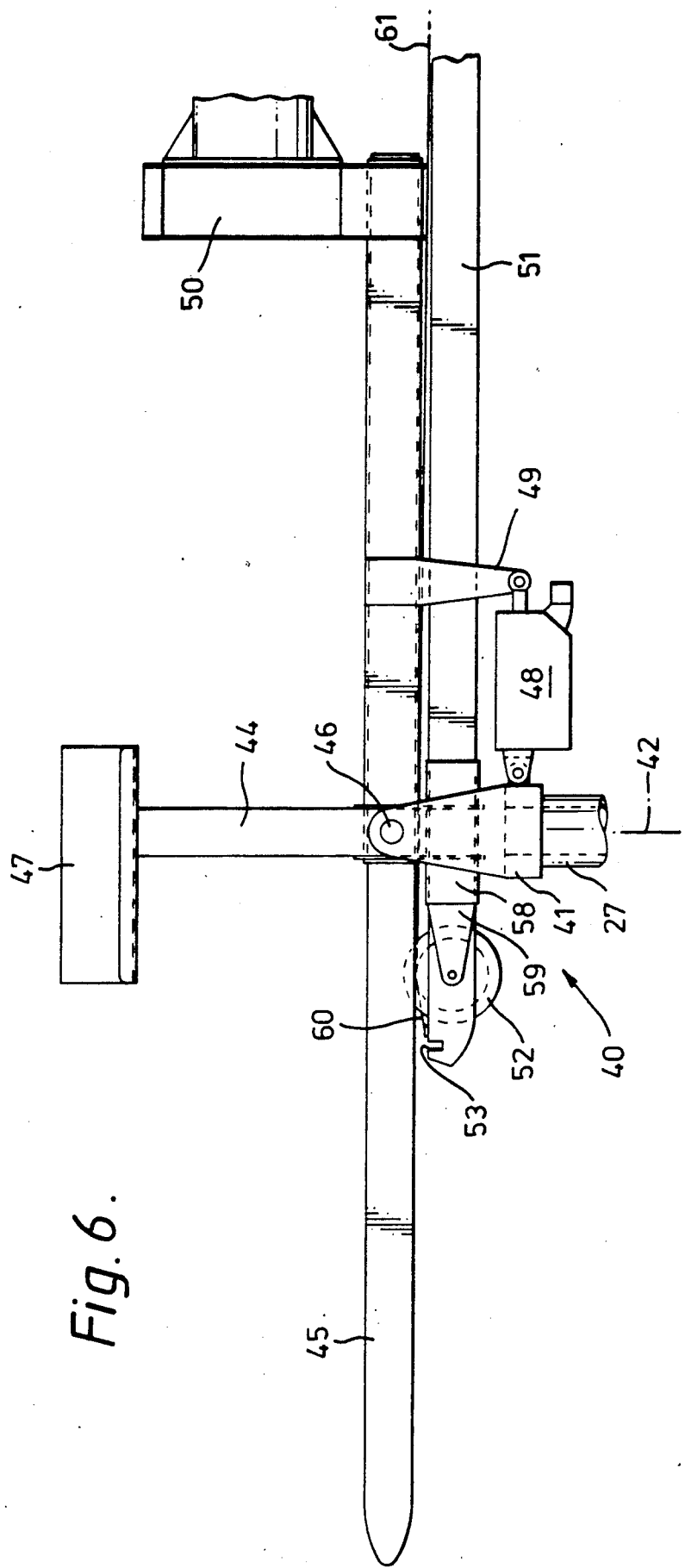
FIG. 6 is a fragmentary side elevation of a further part of the apparatus of the invention.
Figure 7:
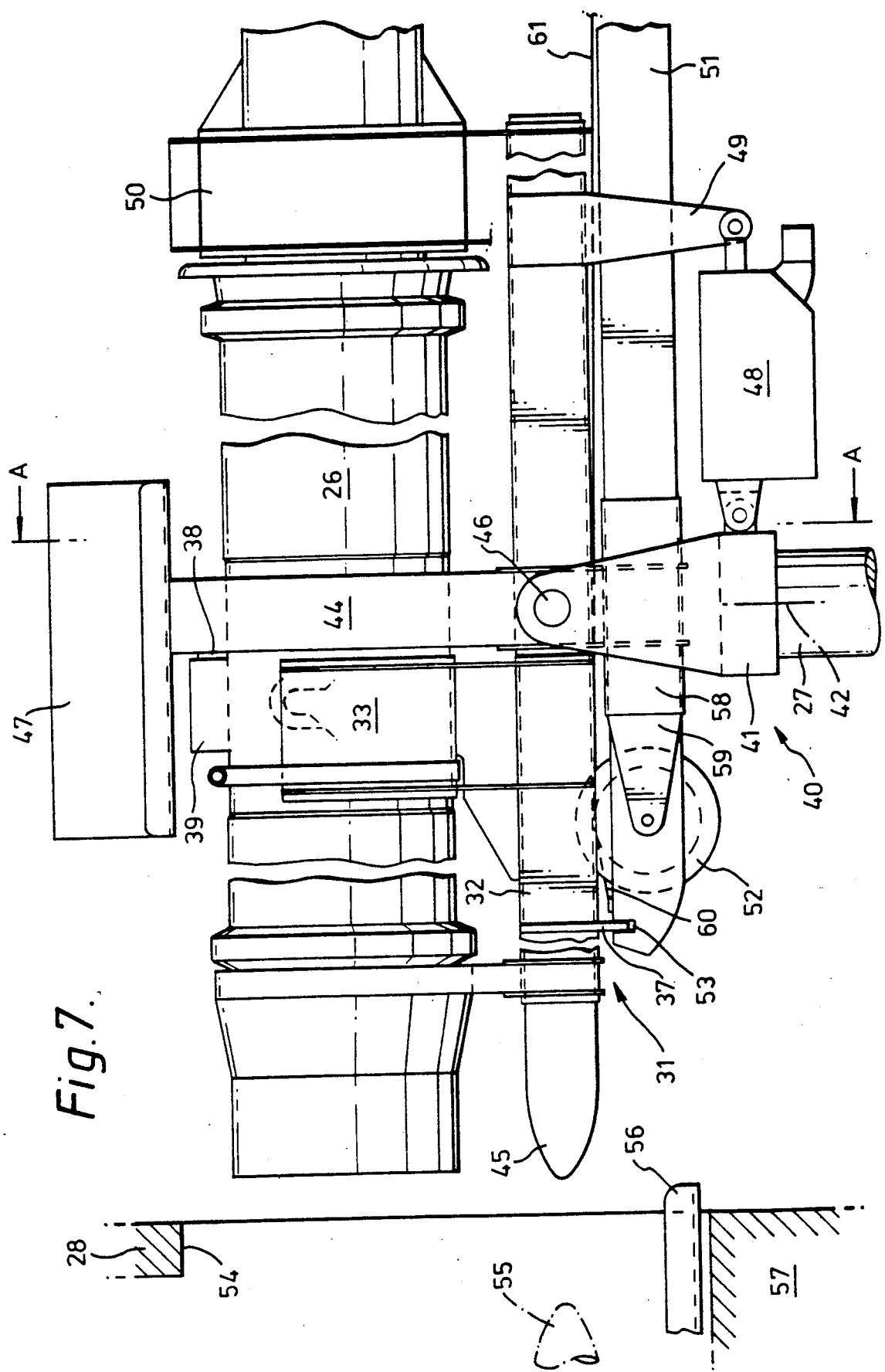
FIG. 7 is a view looking aft with the apparatus in a missile loading position.
Figure 8:
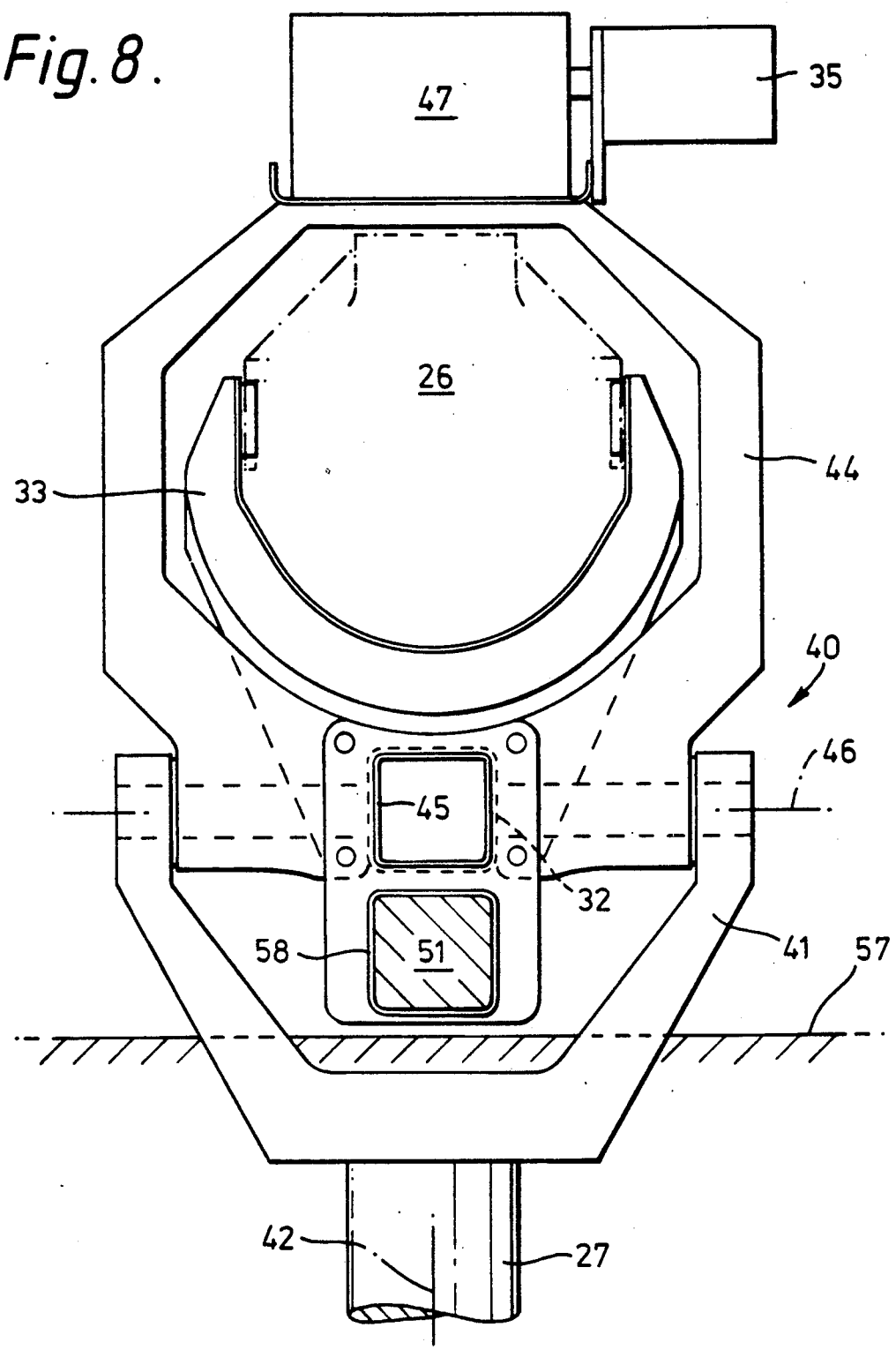
FIG. 8 is a fragmentary sectioned view taken on lines A—A of FIG. 7.

A missile launcher means generally indicated at 40 in FIGS. 6, 7 and 8 is located at the end of the outrigger 27 (FIGS. 2, 3 and 4).

A clevis 41 is located at the end of the outrigger 27 for rotation about a generally vertical axis 42 by a motor (not shown). The clevis 41 supports a generally tubular structure 44 and an elongated longitudinally extending square support beam 45 for pivotal movement about a horizontal axis 46, the tubular structure 44 carrying a remote armament control box 47 and an actuator 35 (FIG. 8) for operating the hold back pin in the receptacle 39 (FIG. 5) and making an electrical connection to the receptacle 38 (FIG. 5).

An electrically operated elevation actuator 48 extends between the clevis 41 and the end of a bracket 49 depending from the support beam 45.

The square support beam 45 is adapted for selective engagement in the square tube 32 attached to the missile (FIG. 5), and a blast tube 50 is located at the rear end of the support beam 45.

The launcher means 40 includes transfer means comprising a loading rod 51 slidably located beneath the support beam 45 in a tube 58 suspended from structure 44 and powered by a rotary actuator (not shown) driving a cable drum 52 mounted on a bracket 59 extended forwardly from tube 58. The cable drum 52 carries a first cable 60 extended forwardly for attachment adjacent a front end of the loading rod 51 and a second cable 61 extended rearwardly for attachment adjacent a rear end of the loading rod 51 so that rotation of the cable drum 52 causes longitudinal sliding movement of the loading rod 51 in tube 58 and relative the support beam 45. A front end of the loading rod 51 has a lateral recess 53 in its upper surface adapted to mate during certain phases of operation with the protruding web 37 on the missile adaptor (FIG. 5).

In FIG. 7, a missile 26 is located on the launcher 40 of FIG. 6. It will be noted that the web 37 is located in the recess 53 at the end of the loading rod 51 and that the square tube 32 is located on the forward end of the support beam 45 so that the remote armament control box 47 is correctly aligned with the hold back pin receptacle 39 and electrical receptacle 38 on the missile 26 to enable correct mating of the parts by the actuator 35 (FIG. 8). The rear end of the missile 26 is aligned with the blast tube 50.

In FIG. 7 the launcher means 40 has been rotated about the vertical axis 42 to a loading position in which the missile 26 extends laterally outside the fuselage 28 so as to be aligned with the carousel 29 (FIG. 3). For reference, the boundary of fuselage 28 is shown in FIG. 7 and includes an aperture 54 for the passage of missiles 26 between the carousel 29 and the launcher means 40 as hereinafter described. It will be noted that the carousel 29 includes, at each missile storage location, a missile support beam 55 of similar cross sectional size and shape to the support beam 45 of the launcher means 40, and a loading rod guide 56 is located on the cabin floor 57.

In operation of the apparatus of this invention, let it be assumed that a missile has been fired, that the launcher means 40 with the cannister of the fired missile has been rotated to the loading position shown in FIG. 7, and that the empty position on the carousel 29 is correctly aligned. Energisation of the motorised cable drum 52 of the transfer means drives the loading rod 51 towards the carousel 29 in the fuselage 28, so that the interengagement of the web 37 and slot 53 serves to push the adaptor 31 and therefore the attached missile cannister, off the support beam 45 of the launcher and onto the empty support beam 55 of the carousel 29. The guide 56 supports and guides the extending loading rod 51 as it enters the fuselage 28. Once the adaptor 31 of the empty cannister is fully home on the beam 55, the carousel is rotated about axis 30 (FIG. 3) until the next missile 26 is correctly aligned with the launcher and the respective web 37 is automatically located in the recess 53 at the end of the loading rod 51. Reversal of the direction of rotation of the cable drum 52 serves to withdraw this missile 26 from the beam 55 on the carousel 29 and transfer it to the support beam 45 of the launcher means 40 and into the position illustrated in FIG. 7. The clevis 41 is then rotated about the axis 42 to rotate the launcher means 40 and the attached missile 26 to the launch position generally parallel with the longitudinal centreline of the fuselage as illustrated in FIGS. 2 to 4 inclusive. The actuator 35 on the remote armament control box 47 is operated to connect the holdback pin and electrical plug.

Thus, apart from conventional control in elevation as indicated at $\alpha$ in FIG. 3, the apparatus of this invention provides for some control in azimuth as indicated at $\beta$ in FIG. 4 by virtue of the capability of rotation of the launcher 40 about axis 42.

A comparison of FIGS. 1 and 2 clearly illustrates a significant advantage of the present apparatus by way of a considerable reduction in the frontal area of the missile transporting and launching apparatus resulting in a corresponding reduction in aerodynamic drag, making possible increased speed, agility and mission duration. Since only one missile has to be moved, changes in elevation can be accomplished by a light weight actuator 48. Furthermore, since the missiles are carried within the protected environment of the helicopter fuselage, no damage occurs as a result of inclement weather conditions.

Whilst one embodiment has been described and illustrated it will be apparent that many modifications may be made without departing from the scope of the invention. For example, other forms of missile storage means may be used within the fuselage, and missile launcher means may be located on both sides of the fuselage and may be supplied either from a common or from separate missile storage means.

What is claimed is:

1. A helicopter including a fuselage, missile storage means for storing a plurality of missiles laterally within said fuselage, first support means mounted on each of said missiles, second support means in said missile storage means, said first and second support means interengaged for retaining said missiles in said storage means, an outrigger extending laterally from the fuselage, missile launcher means mounted at the end of said outrigger for pivotal movement about a vertical axis between a loading position in which the longitudinal axis of the missile launcher means extends generally perpendicular to the longitudinal centerline of the fuselage and a launch position in which the longitudinal axis of the missile launcher means extends generally parallel to the longitudinal centerline of the fuselage, third support means for a missile on said missile launcher means, and transfer means operatively connected to said missile launcher means for transferring a missile and the first support means mounted on said missile from said second support means in said missile storage means to the third support means on said missile launcher means when said missile launcher means is in the loading position.

2. A helicopter including a fuselage, missile storage means for storing a plurality of missiles laterally within said fuselage, said missile storage means including a plurality of elongated storage support beams, a longitudinally extending tubular member attached to each missile in sliding engagement with said storage support beams, an outrigger extending laterally of the fuselage, missile launcher means mounted on the end of said outrigger, said missile launcher means including an elongated launcher support beam for sliding engagement with said tubular member, means pivotally mounting said launcher support beam for pivotal movement about a generally vertical axis between a loading position in which the longitudinally axis of the launcher support beam is generally perpendicular to the longitudinal centerline of the fuselage and a launch position in which the longitudinal axis of the launcher support beam is generally parallel to the longitudinal centerline of the fuselage and transfer means operatively connected to said missile launcher means to slide one of the tubular members attached to a missile together with the missile attached thereto from one of said storage support beams onto said launcher support beam when the missile launcher means is in the loading position thereof.

3. A helicopter as claimed in claim 2 wherein said missile storage means comprises a carousel mounted for rotation about a generally horizontal laterally extending axis and having a plurality of circumferential missile storage positions.

4. A helicopter as claimed in claim 2 wherein said transfer means comprises power operated means to selectively withdraw a missile from said storage means so that the tubular member engages the elongated support beam to support the missile on said launcher means.

5. A helicopter as claimed in claim 4 wherein said transfer means includes a loading rod slidable parallel to and beneath the support beam and having automatic means for effecting attachment to the missile.

6. A helicopter as claimed in claim 5 wherein said automatic means comprises a lateral recess in an upper surface of the loading rod for engagement by a downwardly protruding web on the missile tubular member.

7. A helicopter as claimed in claim 5 wherein said transfer means includes a power operated cable drum having a first cable extending forwardly for attachment adjacent the front end of the loading rod and a second cable extending rearwardly for attachment adjacent the rear end of the loading rod.

* * * * *